Sept. 5, 1944.  W. R. ATKINSON  2,357,375
CLIP
Filed July 20, 1943
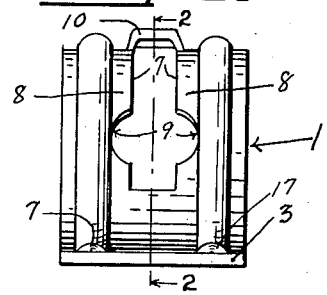
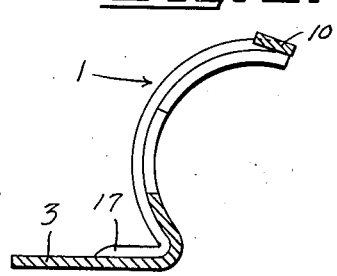
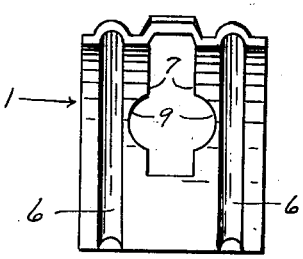
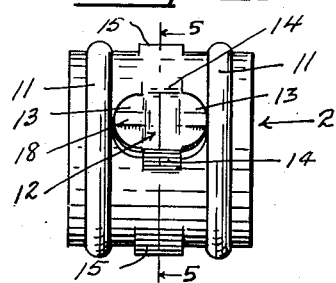
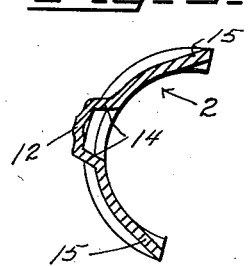
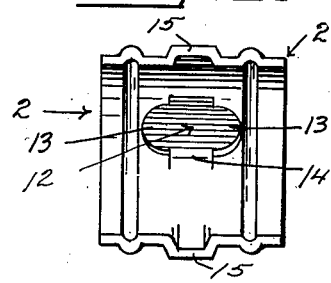
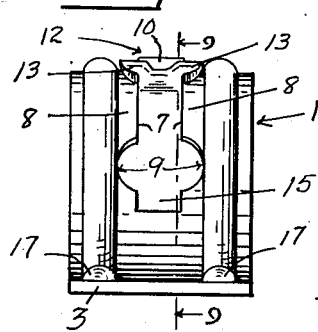
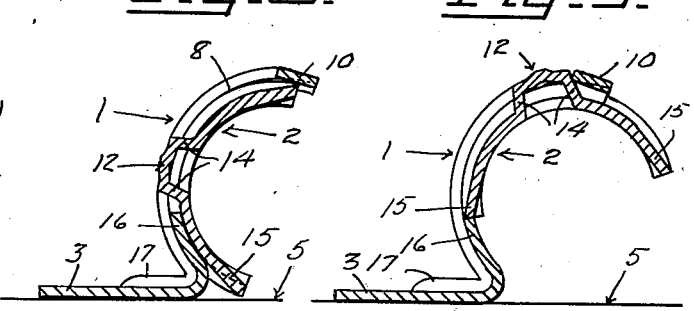
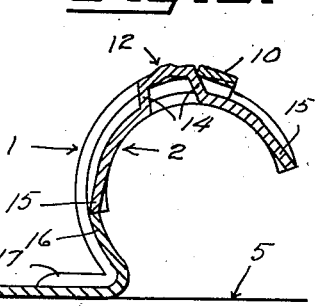
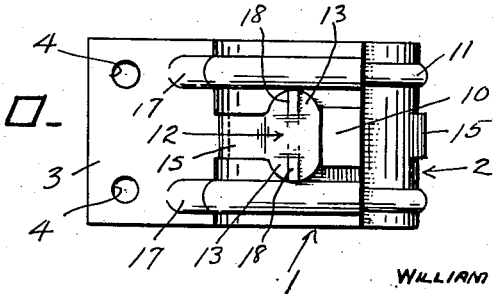
INVENTORS
WILLIAM R. ATKINSON
BY
Boykin, Mohler & Beckley
ATTORNEYS.

Patented Sept. 5, 1944

2,357,375

UNITED STATES PATENT OFFICE 2,357,375

CLIP

William R. Atkinson, San Francisco, Calif.

Application July 20, 1943, Serial No. 495,407

7 Claims. (Cl. 248—74)

This invention relates to a clip for holding electrical wires, cable, pipe, etc., along a wall or wherever desired.

Objects of the invention are to provide a clip that is economical to make, strong, simple to assemble and disassemble, easy to operate for locking and for unlocking the wire or cable to be held thereby, and which clip has few parts and will cooperate with the wall or ceiling to which the clip is secured for firmly holding the wire, wires, cable, pipe, etc., when in locked relation thereto.

Other objects and advantages will appear in the description and drawing.

The clip disclosed in the drawing is in two parts, each of which comprises an arcuate or segmental strip, and the two segmental strips are concentric for circumferential sliding relative to each other, thus providing an outer strip and an inner strip.

In the drawing

Fig. 1 is an elevational view of the outer strip of the pair as seen from the convex side thereof.

Fig. 2 is a sectional view taken along the line 2—2 of Fig. 1.

Fig. 3 is an elevational view of the outer strip as seen from the concave side thereof.

Fig. 4 is an elevational view of the inner strip of the pair as seen from the convex side thereof.

Fig. 5 is a sectional view taken along line 5—5 of Fig. 4.

Fig. 6 is an elevational view of the inner strip as seen from the concave side thereof.

Fig. 7 is an elevational view of the assembled strips as seen from the convex side of the outer strip in which said outer strip is in the same position as in Fig. 1 but the inner strip is in cable or wire locking position.

Fig. 8 is a sectional view of the assembled strips with the inner strip in cable or wire releasing position and separable from the outer strip if so desired.

Fig. 9 is a sectional view as seen from line 9—9 of Fig. 7.

Fig. 10 is a plan view of the assembled clip of Fig. 9.

By "segmental strips" I mean strips that are respectively segments of an annulus, such as a ring, in which the flat sides are radially directed as distinguished from a disk-like segment.

The outer segmental strip of the pair is generally designated 1, while the inner strip is generally designated 2.

One end of the strip 1 is formed with a flat extension 3 integral therewith, and which extension is bent or extended rearwardly relative to the concave side of the arcuate portion. This extension may be formed with one or more holes 4 therein (Fig. 10) for screws, nails or for welding material, according to whether the clip is to be secured to a wooden or a metal wall, although it is obvious that screws, bolts, or the like, may secure the extension to cement, tile, etc., and also bolts may be used with a metal wall. The important fact is that extension 3 provides means for securing the clip to a support, whether the latter be a wall, ceiling, post, frame, or any other structure, and whether it be of wood, metal, cement, or other material. Also the extension 3 may be welded at its edges to a metal support.

The arcuate strip 1 preferably does not define more than a half circle, and ordinarily less, but somewhat more than a quarter circle, as seen in Fig. 2. The extension 3, being adapted to lie flat against a flat support, such as a wall, is at an angle that will support the arcuate portion of the strip in position extending away from such wall, but slightly inclined so that the free end of the arcuate portion may be on a line extending from the juncture of said arcuate portion and said extension at an angle relative to said extension of somewhere between say about 110° and 130°. Thus the concave side of said segmental strip 1 will generally face toward the plane of the wall against which the extension 3 is secured (Fig. 2).

The inner strip 2 may follow a curve whose center is not coincident with the center about which the outer strip 2 is drawn, but the outer convex side of strip 2 that is slidable against the inner concave side of strip 1 may be developed about a shorter radius than that about which said inner concave side is developed. However, this difference is relatively small and ordinarily does not vary more than about $\frac{1}{32}$ of an inch, and therefore, the strips are substantially concentric.

The segmental inner strip 2 preferably does not exceed a half circular segment, being approximately that length, and therefore, it is longer than the arcuate portion of strip 1. When the extension 3 is secured against a wall 5 (Fig. 8) the end of strip 2 that is adjacent the extension will extend past the juncture between the latter and strip 1 to the wall, in which position the opposite ends of strips 1, 2 are about even with each other. This is the "collapsed" position of the strips, and in this position the cable, wires, pipe, or whatever is to be held by the clip may be slipped past the adjacent free ends of strips 1, 2 and against the concave side of strip 2.

A circumferential sliding of strip 2 on strip 1 past the free outer end of strip 1, starting from the collapsed position will result in the extension of strip 2 around the wire or cable that is against its concave side, thus holding such wire or cable in the clip between wall 5 and the concave sides of the strips. It is understood that the curvature of the strips is preferably nearly that of the cross sectional contour of the cable, wire or pipe. Electrical conduits and other generally cylindrical objects are suitable for holding by the clips. Fig. 9 shows the clip in "extended position" in which the overall length of the strips 1, 2 defines substantially more than a semi-circle as distinguished from their overall length when in collapsed position.

The outer segmental strip 1 is formed to provide a pair of spaced, parallel grooves 6 (Fig. 3) extending longitudinally thereof on the concave side of the strip, and between said grooves is formed an elongated slot 7 also extending longitudinally of the strip. Slot 7 is centrally between the side edges of strip 1 and the side edges of said slot are preferably equally spaced from grooves 6 respectively, thus leaving a relatively narrow section 8 of the strip between grooves 6 and the slot (Fig. 1).

Slot 7 is enlarged in its width adjacent, but spaced from the end thereof that is nearest extension 3, as indicated at 9 (Fig. 1). A cross piece 10 connects the side edges of the slot at the free end of strip 1 which cross piece is integral with the strip and is bent to a position offset radially outwardly of the main body of the strip.

The inner segmental strip 2 is symmetrical and is formed with a pair of parallel spaced ridges 11 (Fig. 4) projecting from its convex side, which ridges extend longitudinally of strip 2 and are so spaced and shaped as to fit in grooves 6 in strip 1.

Centrally between its ends and also centrally relative to its side edges, a piece 12 is stamped out and forced outwardly of the convex side of the strip, which piece has a pair of oppositely outwardly projecting lips 13 that are adapted to slip through the enlarged portion 9 of slot 7 so as to lie above the convex side of strip 1 when ridges 11 are in grooves 6. Webs 14 at opposite sides of the piece 12 are adapted to fit in slot 7 when the strip 1 is turned or revolved circumferentially thereof relative to strip 2, and when said strip 2 is so moved the lips 13 will slidably engage the convex side of sections 8 (Fig. 7).

At the opposite ends of strip 2 and centrally between the side edges, a portion 15 is bent radially outwardly relative to the normal circular curvature of the strip. These portions are of substantially the width of the slot 7 so as to slide in the slot, and upon revolving strip 2 within strip 1 until the piece 12 substantially engages the cross piece 10, the portion 15 at one end will slide toward slot 7 under spring tension of the strip against the portion 16 of strip 1 that lies between the extension 3 and the end of slot 7 adjacent thereto (Figs. 8, 9). But as soon as portion 15 slips over the end edge of slot 7 it will snap into the slot, and as it cannot slide back out of the slot, the strips 1, 2 will be locked in extended position of the strips as seen in Figs. 9, 10. By pressing the portion 15 radially inwardly until it clears the end edge of slot 7, the strip 2 can then be revolved in strip 1 to collapsed position of the strips.

The provision of a projection 15 at opposite ends of the strip 2 makes strip 2 reversible, end for end, in the strip 1, thus expediting assembly of the clip.

As strips 1, 2 are preferably of resilient sheet metal, the grooves 6 may be stamped in the strip 1 and will thus form ridges on the convex side of said strip that will function to reinforce the strip. By extending the ridge and groove into extension 3 as at 17 (Fig. 2), the juncture between the arcuate portion of the strip and the extension will be reinforced against accidental bending. Strip 2 is similarly reinforced by ridges 11 and by forming ridges 18 on the lips 13 (Fig. 10) these lips are reinforced.

The slight difference between the curvature of the inner strip 2 and the outer strip 1 as herein described, is not absolutely essential, but is preferable. For example, in clips for cables from one-half to one inch in diameter in progressive increases of one-eighth inch, the differences between the diameters of the inner and outer strips may vary from about one sixty-fourth of an inch to about five sixty-fourths, or a proportionate increase of one sixty-fourth of an inch in the difference for each eighth of an inch increase in the diameter of the cable adapted to be fitted by different clips. Such structure insures a tighter fit on the cable by the clip than otherwise, since the strip 2 tends to move into progressively tighter relation to the cable as it moves to extended position.

Having described the invention, I claim:

1. A clip of the character described comprising a pair of substantially concentric segmental strips secured together for relative circumferential movement thereof about their axes from a collapsed position defining substantially a semicircle between their ends to an extended position in which the inner strip of the pair is extended at one of its ends substantially beyond the outer strip of the pair but generally in continuation of the arc of the outer strip; means so securing said strips together; releasable locking elements respectively rigid with said strips for movement therewith and automatically engageable in locked relation to each other upon movement of said strips to said extended position thereby locking said strips together against reverse movement to collapsed position.

2. A clip of the character described comprising a pair of substantially concentric segmental strips secured together for relative circumferential movement thereof about their axes from a collapsed position defining substantially a semicircle between their ends to an extended position in which the inner strip of the pair is extended at one of its ends substantially beyond the outer strip of the pair but generally in continuation of the arc of the outer strip; means so securing said strips together; releasable locking elements respectively rigid with said strips for movement therewith and automatically engageable in locked relation to each other upon movement of said strips to said extended position thereby locking said strips together against reverse movement to collapsed position; a slot formed in one of said strips extending longitudinally thereof, and a projection formed on the other of said strips extending through said slot and slidable longitudinally of the latter upon such movement of said strips relative to each other.

3. A clip of the character described comprising a pair of substantially concentric segmental strips secured together for relative circumferential movement thereof about their axes from a collapsed position defining substantially a semicircle between their ends to an extended position in which the inner strip of the pair is extended at one of its ends substantially beyond the outer strip of the pair but generally in continuation of the arc of the outer strip; means so securing said strips together; releasable locking elements respectively rigid with said strips for movement therewith and automatically engageable in locked relation to each other upon movement of said strips to said extended position thereby locking said strips together against reverse movement to collapsed position; said releasable locking elements including a radial projection at one end of one of said strips and a recess formed in the other strip of the pair positioned to receive said projection therein when said strips are in said extended position.

4. A clip of the character described comprising a pair of substantially concentric segmental strips secured together for relative circumferential movement thereof about their axes from a collapsed position defining substantially a semicircle between their ends to an extended position in which the inner strip of the pair is extended at one of its ends substantially beyond the outer strip of the pair but generally in continuation of the arc of the outer strip; means so securing said strips together; releasable locking elements respectively rigid with said strips for movement therewith and automatically engageable in locked relation to each other upon movement of said strips to said extended position thereby locking said strips together against reverse movement to collapsed position; complementarily formed ridges and grooves respectively formed in said strips and extending longitudinally thereof for holding said strips substantially coaxial during their said circumferential movement relative to each other.

5. A clip of the character described comprising an outer segmental strip having an extension integral therewith at one of its ends and which extension projects outwardly relative to the curve of the strip; an inner segmental strip within said outer strip and slidable from a collapsed position in which one of its ends is about even with the end of the outer strip that is remote from said extension to an extended position in which a substantial portion of the inner strip projects beyond said end of the outer strip and generally in continuation of the curve of the latter; a portion of said inner strip overlying the convex side of said outer strip for securing said strips together during said movement; a pair of automatically engageable elements respectively carried by said strips adapted to interlock with each other upon movement of said inner strip to said extended position for securing said inner strip against reverse movement thereof to said collapsed position.

6. A clip of the character described comprising an outer segmental strip having an extension integral therewith at one of its ends and which extension projects outwardly relative to the curve of the strip; an inner segmental strip within said outer strip and slidable from a collapsed position in which one of its ends is about even with the end of the outer strip that is remote from said extension to an extended position in which a substantial portion of the inner strip projects beyond said end of the outer strip and generally in continuation of the curve of the latter; a portion of said inner strip overlying the convex side of said outer strip for securing said strips together during said movement; a pair of automatically engageable elements respectively carried by said strips adapted to interlock with each other upon movement of said inner strip to said extended position for securing said inner strip against reverse movement thereof to said collapsed position; one of the elements of said pair being yieldably secured to the strip carrying the same for movement under external force to a position released from the other element of the pair for permitting movement of the inner strip to said collapsed position upon application of such force.

7. A clip of the character described comprising an outer segmental strip having an extension integral therewith at one of its ends and which extension projects outwardly relative to the curve of the strip; an inner segmental strip within said outer strip and slidable from a collapsed position in which one of its ends is about even with the end of the outer strip that is remote from said extension to an extended position in which a substantial portion of the inner strip projects beyond said end of the outer strip and generally in continuation of the curve of the latter; a portion of said inner strip overlying the convex side of said outer strip for securing said strips together during said movement; a pair of automatically engageable elements respectively carried by said strips adapted to interlock with each other upon movement of said inner strip to said extended position for securing said inner strip against reverse movement thereof to said collapsed position; the centers about which said respective strips are developed being slightly different with the radius of the convex surface of the inner strip being shorter than the radius of the concave surface of the outer strip against which said convex surface is in substantial engagement.

WILLIAM R. ATKINSON.